US006401015B1

(12) United States Patent
Stewart et al.

(10) Patent No.: US 6,401,015 B1
(45) Date of Patent: Jun. 4, 2002

(54) DISTRIBUTED POWER AND ELECTRONIC AIR BRAKE CONTROL SYSTEM FOR A TRAIN AND ASSOCIATED METHODS

(76) Inventors: Scot Stewart, 615 Pinetree Dr., Indialantic, FL (US) 32903; Dale Delaruelle, 2609 S. Putters La., Melbourne, FL (US) 32901; Premal Desai, 5740 Herons' Landing Dr., Viera, FL (US) 32955; Mark Wheeler, 598 Nackman Rd., NW., Palm Bay, FL (US) 32907; Don Herndon, 540 Nightingale Dr., Indialantic, FL (US) 32903; Brett Pierce, 16 Canterbury Dr., Arden, NC (US) 28704; Ronald O. Newton, 10590 Wright Street Rd., Adams, NY (US) 13605; Kevin Root, R.D. 1 Box 136, Black River, NY (US) 13612; John J. Allen, Jr., 25750 NYS Route 12, Watertown, NY (US) 13601

( * ) Notice: Subject to any disclaimer, the term of this patent is extended or adjusted under 35 U.S.C. 154(b) by 0 days.

(21) Appl. No.: 09/173,092

(22) Filed: Oct. 14, 1998

Related U.S. Application Data

(60) Provisional application No. 60/061,810, filed on Oct. 15, 1997, and provisional application No. 60/061,994, filed on Oct. 14, 1997.

(51) Int. Cl.[7] ................................................ B61C 17/12
(52) U.S. Cl. ............................ 701/19; 701/36; 701/70; 303/7; 246/167
(58) Field of Search .......................... 701/19, 36, 70; 303/3, 16, 20, 15, 7; 246/187, 167

(56) References Cited

U.S. PATENT DOCUMENTS 5,681,015 A * 10/1997 Kull ........................ 246/187

* cited by examiner

Primary Examiner—William A. Cuchlinski, Jr.
Assistant Examiner—Arthur D. Donnelly
(74) Attorney, Agent, or Firm—Carl Rowold; Armstrong Teasdale LLP

(57) ABSTRACT

A train control system includes a plurality of control subsystems for installation in respective locomotives. At least one of the control subsystems is configurable as a lead control subsystem, and at least one other control subsystem is configurable as a remote control subsystem. Each control subsystem preferably comprises a radio transceiver, a first processor connected to the radio transceiver for communicating with at least one other control subsystem, an electronic brake valve connected to the first processor, and an electro-pneumatic controller connected to the first processor and the electronic brake valve, for interfacing to the air brake system of the train. The first processor preferably comprises a locomotive computer interface for performing both distributed power and electronic air brake functions in cooperation with the locomotive control computer. The distributed power functions may comprise at least one of tractive effort and dynamic braking functions. The electronic air brake functions preferably comprise at least one of automatic service braking, independent braking, and emergency braking.

36 Claims, 4 Drawing Sheets

DISTRIBUTED POWER AND ELECTRONIC AIR BRAKE CONTROL SYSTEM FOR A TRAIN AND ASSOCIATED METHODS

RELATED APPLICATION

This application is based upon prior filed copending provisional application Nos. 60/061,810 filed Oct. 15, 1997 and 60/061,994 filed Oct. 14, 1997, the entire disclosures of both are incorporated herein by reference.

FIELD OF THE INVENTION

The present invention relates to the field of train equipment, and, more particularly, to railway braking and throttle control equipment and associated methods.

BACKGROUND OF THE INVENTION

Trains are widely used to transport people and freight. Freight trains in particular may be relatively long and include several groups of locomotives (consists). For example, a freight train may be a mile long or more. Coordination is required for operating the locomotives to ensure proper traction and braking, for example.

U.S. Pat. Nos. 4,582,280 and 4,553,723 to Nichols et al. are seminal patents directed to a radio communication based train control system. The radio communication system is for a lead unit and a plurality of remote units. The system includes a protocol for establishing a communication link between the lead unit and the one or more remote units. The protocol prevents any of the units in the system from processing messages or commands from other units in other train systems or processing messages or commands originating from units with the train system but which are addressed to other units. A communications channel contention feature is provided for minimizing the probability of multiple units within the system from transmitting on the common communications channel at the same time. In addition, the system insures that the highest priority communications are transmitted first in time. The control system provides for the coordinated control of the air braking functions in the train.

More recently New York Air Brake Corporation has offered its CCB (II) electronic air brake equipment (EAB) for train and locomotive air brakes with an interface to the control computer (ILC). Such equipment is further described in U.S. Pat. No. 5,172,316 to Root et al.

Another application of computer based control systems relates to so-called "distributed power" (DP) functions. Such distributed power functions typically control locomotive tractive effort and dynamic braking as well as air brakes. In particular, GE HARRIS Railway Electronics, L.L.C. offers a radio based control system under the designation LOCOTROL® which provides coordinated distributed power and air brake control of the remote locomotives from the lead locomotive. The system controls tractive effort and braking effort for up to four consists for all types of freight over all types of terrain. Each equipped unit can be operated as a lead or a remote unit.

In the past, two separate control systems were needed and used for the distributed power (DP) and electronic air brake (EAB) functions on a locomotive. These separate control systems had separate processors for each function.

The level of sophistication of the control systems found on locomotives has also been increasing. Today many locomotives include a control computer with standard system and operator interfaces for the distributed power and electronic air brake controls. Locomotives with the control computer and standard interface are generally termed LSI (Locomotive System Integration) compliant and the computer is typically referred to as the integrated locomotive computer (ILC). The locomotive control computer interfaces separately to the two subsystems (EAB and DP) for each function.

Unfortunately, the present approach of two separate processors and subsystems for the distributed power and electronic air brake functions, requires a relatively large amount of precious space within the locomotive. In addition, although conventional systems have a high reliability, certain failures can still render the train inoperable.

Although many modern locomotives include the updated ILC control computer, existing and some new locomotives do not. To control distributed power and electronic air brake functions in such non-LSI compliant locomotives, control must be achieved using the locomotive.

SUMMARY OF THE INVENTION

In view of the foregoing background, it is therefore an object of the present invention to provide a railway control system for both distributed power and electronic air brake functions having a high reliability and consuming less space.

It is another object of the invention to provide such a control system that may be selectively used on either LSI compliant or non-LSI compliant locomotives.

These and other objects, features and advantages in accordance with the present invention are provided by a control system comprising a train control system for a train comprising a plurality of locomotives and an air brake system. Each locomotive preferably comprises a locomotive control computer. The train control system includes a plurality of control subsystems for installation in respective locomotives. At least one of the control subsystems is configurable as a lead control subsystem, and at least one other control subsystem is configurable as a remote control subsystem. Each control subsystem preferably comprises one or more radio transceivers, a first processor connected to the radio transceiver for communicating with at least one other control subsystem on another locomotive, an electronic brake valve connected to the first processor, and an electro-pneumatic controller connected to the first processor for interfacing to the air brake system of the train.

Moreover, the first processor preferably comprises a locomotive computer interface for performing both distributed power and electronic air brake functions in cooperation with the locomotive control computer. The distributed power functions may comprise at least one of tractive effort functions, dynamic braking and air brake functions. The electronic air brake functions preferably comprise at least one of automatic service braking, independent braking, and emergency braking. Accordingly, the size of the subsystem is reduced compared to separate distributed power and electronic air brake systems. In addition, reliability is increased.

Each control subsystem also preferably further comprises at least one other processor associated with one of the electronic brake valve and the electro-pneumatic controller and operatively connected to the first processor. In one embodiment, both the electronic brake valve and electro-pneumatic controller include at least one processor. In accordance with another advantageous feature of the invention, the first processor and the at least one other processor comprise distributed processing means for providing a distributed control network. The distributed processing means provide for detection, isolation and response to failures. Thus, reliability is also increased by the distributed control network defined by the multiple processors of the respective devices.

Each control subsystem may further include a trainline drive/sense interface for electrical interfacing on non-LSI compliant locomotives. In addition, each control subsystem may further comprise an antenna connected to the transceiver.

The first processor preferably further comprises status information means for communicating status information when configured as a remote control subsystem. Similarly, the first processor further comprises command information means for communicating command information when configured as a lead control subsystem. Each subsystem is preferably configurable as either a lead or remote control subsystem.

The first processor may comprise means for deselecting distributed power control function. In other words, the control subsystem in some applications may be operated to only use the electronic air brake control functions.

Each control subsystem may further comprise a first housing containing the first processor. In addition, the electronic brake valve may include a second housing, and the electro-pneumatic controller may include a third housing.

A method aspect of the invention is directed to a train control method for a train comprising a plurality of locomotives and an air brake system. Each locomotive also preferably includes a locomotive control computer. The train control method preferably comprises the steps of: installing a plurality of control subsystems in respective locomotives; configuring at least one of the control subsystems as a lead control subsystem; and configuring at least one other control subsystem as a remote control subsystem. Each control subsystem preferably comprises a radio transceiver, a first processor connected to the radio transceiver for communicating with at least one other control subsystem, an electronic brake valve connected to the first processor, and an electro-pneumatic controller connected to the first processor, for interfacing to the air brake system of the train. The first processor preferably comprises a locomotive computer interface for performing both distributed power and electronic air brake functions in cooperation with the locomotive control computer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As an initial matter, a number of terms used throughout the description are first defined. Automatic Braking is the controlled application or release of air brakes throughout the train and locomotive consist in response to movement of the Automatic brake handle of the operator's Electronic Brake Valve (EBV) in the "service" region, on the Lead locomotive of the Lead consist. Emergency Braking is the rapid venting or reduction of brake pipe pressure throughout the train and locomotive consist to apply the brakes at a level which is intended to stop the train within shortest possible distance. Independent Braking is the controlled application or release of air brakes throughout the locomotive consist only in response the movement of operator's Independent Brake handle of the operator's Electronic Brake Valve (EBV) on the Lead unit.

The Locomotive Process Controller (LPC) is the main computing platform for the GE AC 6000 locomotive, a typical LSI compliant locomotive. This computer contains the majority of the locomotive control system software. All the LSI components and subsystems are controlled by this computer. The Locomotive System Integration (LSI) is an industry standard locomotive interface for electronic and communication products. It is used to integrated various third party electronic components and subsystems with the locomotive control system. Standards for LSI components are maintained by ARINC under contract for AAR. The Video Information Displays (VIDs) are used for displaying various locomotive operating parameters as well as for set up of DP and EAB operational parameters. The Video Process Controller (VPC) is the computer that controls the Video Information Displays (VIDs) on AC 6000 locomotives.

Figure 1:
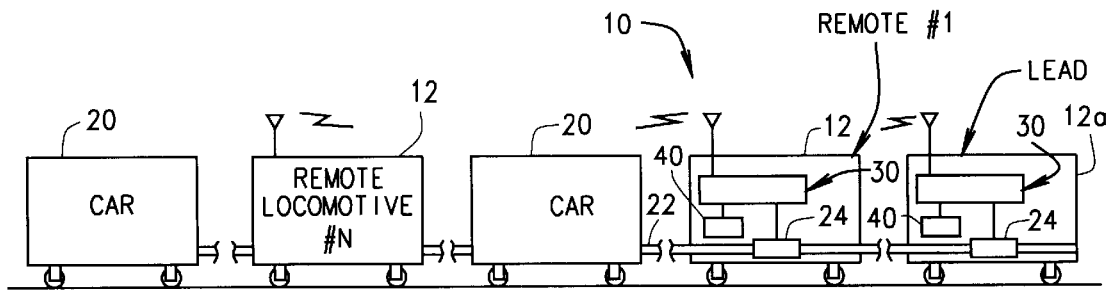
FIG. 1 is a schematic diagram of a portion of a train including the control system in accordance with the present invention.
Figure 2:
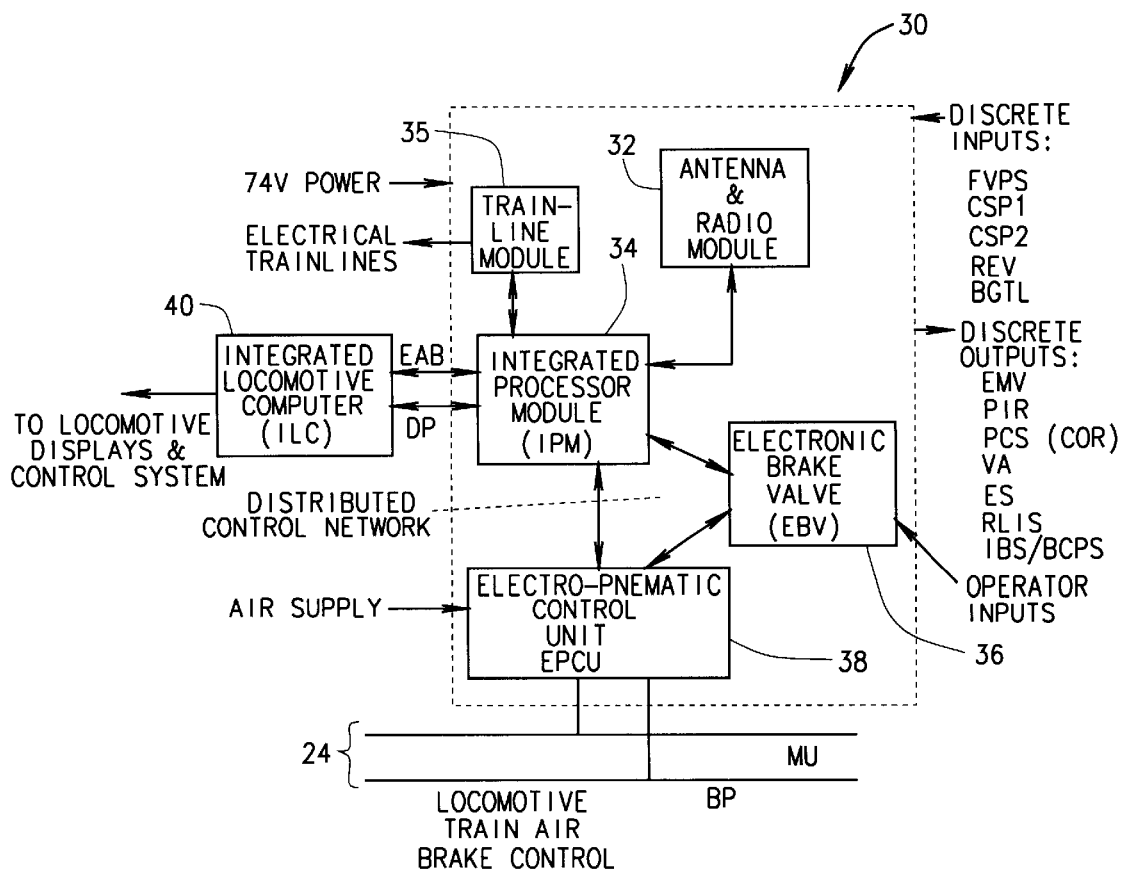
FIG. 2 is a schematic block diagram of a control subsystem of the invention as would be installed on a locomotive.

Turning now to FIGS. 1 and 2, the train control system 10 in accordance with the invention is first described. The train illustratively includes a plurality of rail cars 20 and a plurality of locomotive consists 12. The train illustratively includes an air brake system including the schematically illustrated air brake line 22 and air controls 24 as will be readily appreciated by those skilled in the art. Each locomotive 12 illustratively includes a locomotive control computer 40, such as the integrated locomotive computer (ILC) compliant with the LSI standard as will also be appreciated by those skilled in the art.

The train control system 10 includes a plurality of control subsystems 30 for installation in respective locomotives. At least one of the control subsystems is configurable as a lead control subsystem 30. In the illustrated embodiment, the control subsystem 30 in the lead locomotive 12a is configured as a lead control subsystem. At least one other control subsystem is configured as a remote control subsystem 30. In the illustrated embodiment, the remote #1 locomotive consist to the Nth locomotive consist each includes a control subsystems 30 configured as a remote as will be described in greater detail below.

Each control subsystem 30 may include at least one radio transceiver and associated antenna, such as provided by the illustrated radio module and antenna module 32 in FIG. 2. The control subsystem 30 also includes a first processor connected to the radio transceiver for communicating with at least one other control subsystem. The first processor is part of the integrated processor module (IPM) 34. The IPM 34 also includes a housing containing the processor and associated electronics.

The first processor of the IPM 34 preferably further comprises status information means for communicating status information when configured as a remote control subsystem. Similarly, the first processor further comprises command information means for communicating command information when configured as a lead control subsystem. The first processor may comprise means for deselecting distributed power control function. These means are provided by software programs implemented by the first processor of the IPM 34. In other words, the control subsystem in some applications may be operated to only use the electronic air brake control.

The control subsystem 30 also includes an electronic brake valve (EBV) 36 connected to the first processor. The electronic brake valve 36 includes a housing, a processor and associated electronics, and one or more input devices for the user. The EBV 36 provides the interface for the operator as will be described in greater detail below and as will be readily appreciated by those skilled in the art.

An electro-pneumatic controller (EPCU) 38 is connected to the first processor of the IPM 34 and the EBV 36. The EPCU 38 includes a housing, one or more processors and associated electronics. The EPCU 38 is for interfacing to the air brake system 24, 22 of the train as will also be described in greater detail below and as will be readily appreciated by those skilled in the art.

Figure 3:
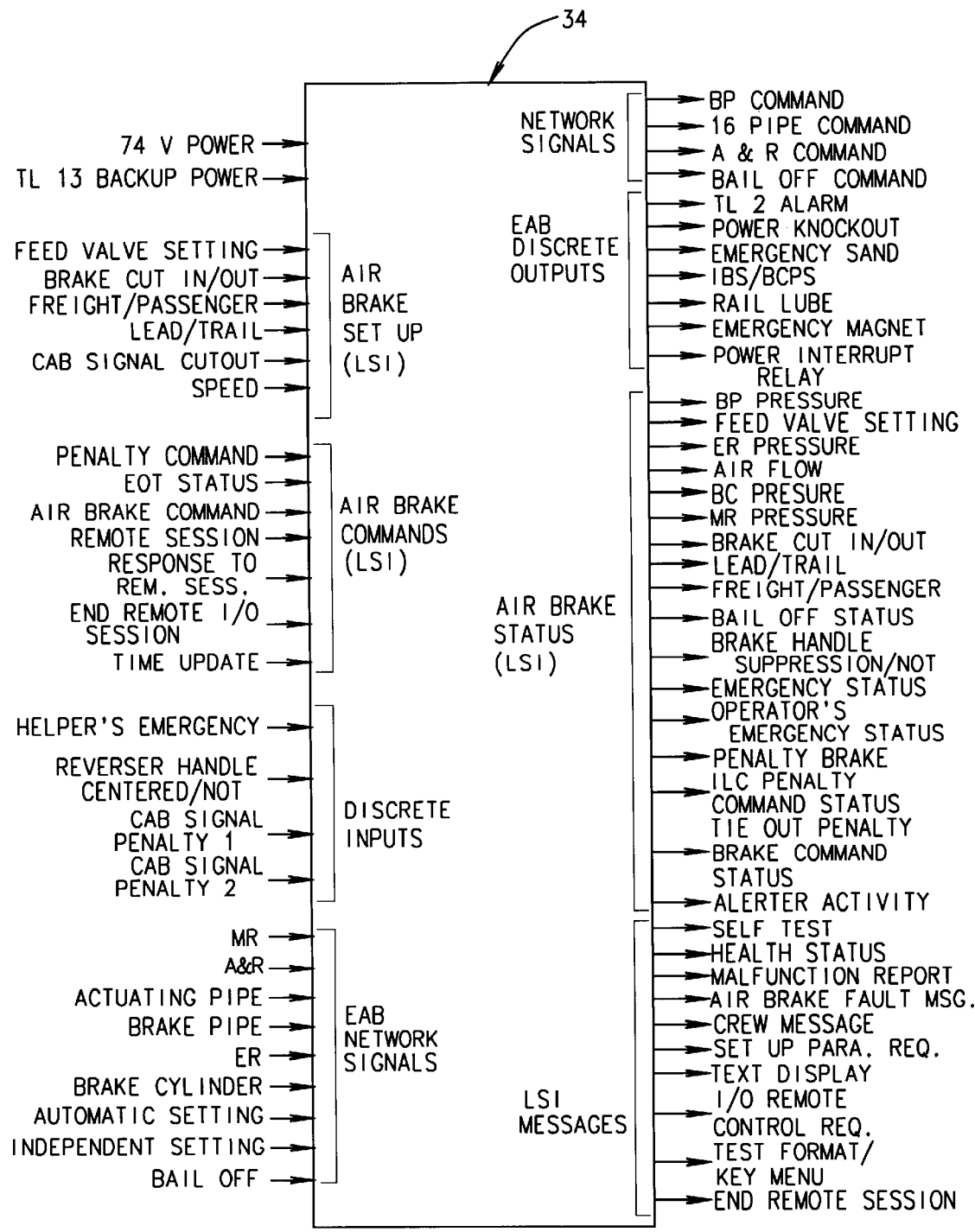
FIG. 3 is a more detailed functional block diagram of the air brake functional interfaces of the integrated processor module of the subsystem as shown in FIG. 2.
Figure 4:
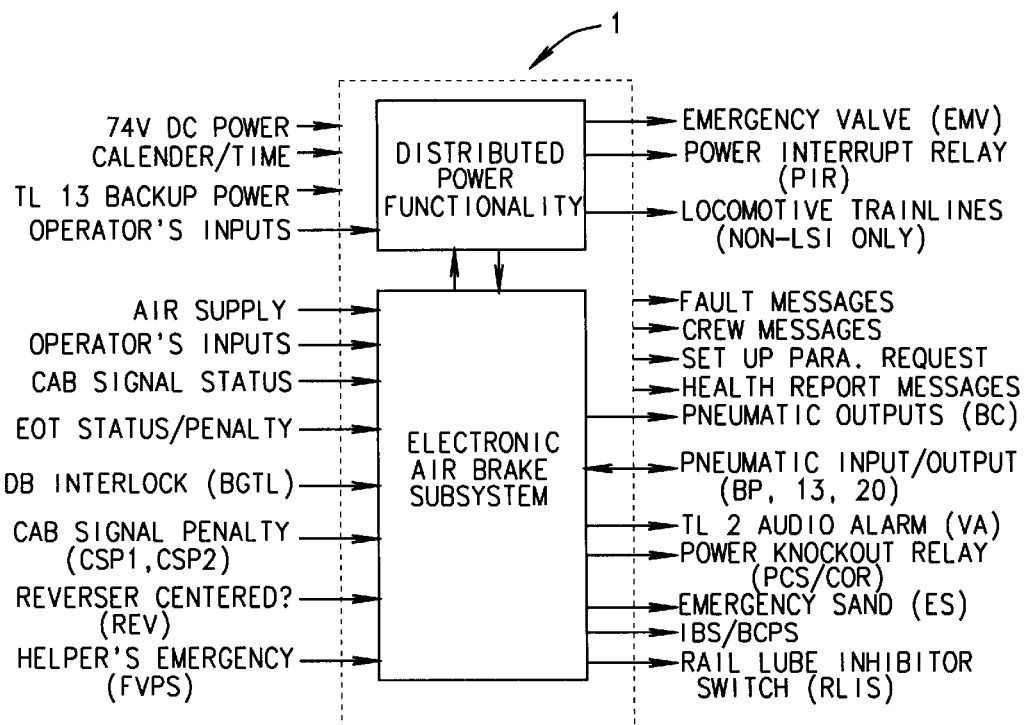
FIG. 4 is a functional block diagram of the integrated processor module as shown in FIG. 2 illustrating the functional inputs and outputs.

Referring now additionally to FIGS. 3 and 4, the first processor of the IPM 34 is further described. The first processor preferably comprises a locomotive computer interface for communicating both distributed power and electronic air brake signals with the locomotive control computer. The distributed power signals may comprise at least one of tractive effort signals, dynamic braking and air braking signals. The electronic air brake signals preferably comprise at least one of automatic service brake signals, independent brake signals, and emergency brake signals. The detailed operation and specifications of the IPM 34 and other components are described extensively below. It is highlighted that the overall size of the control subsystem 30 in accordance with the invention is reduced compared to separate distributed power and electronic air brake systems. In addition, reliability is increased.

Figure 5:
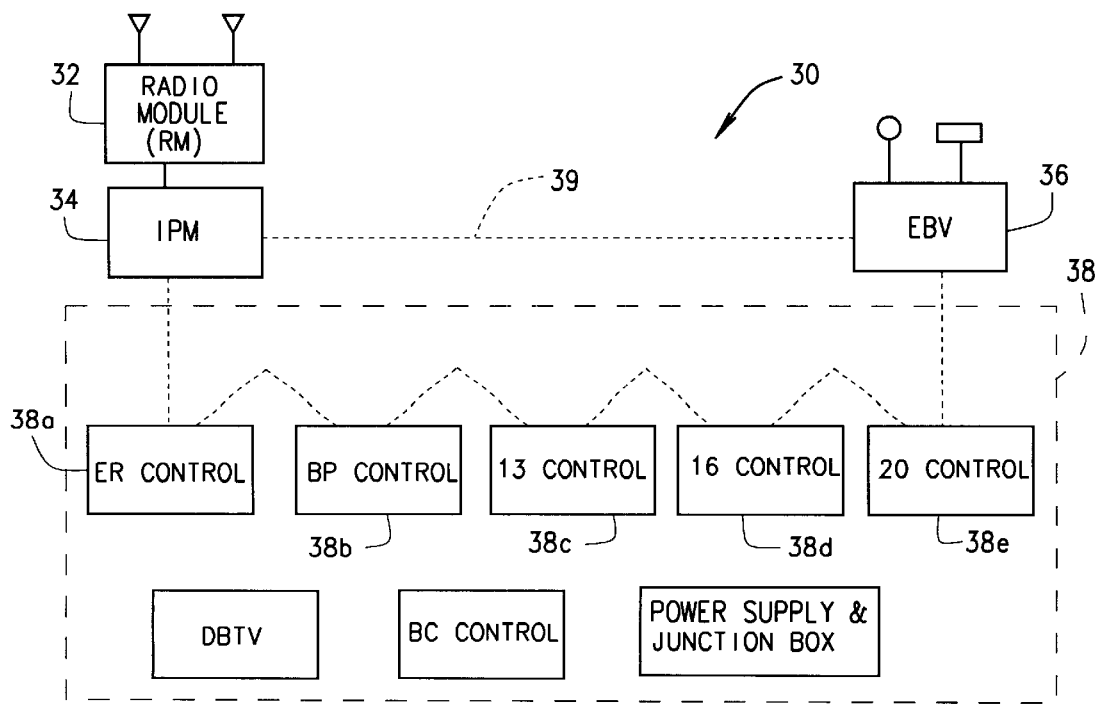
FIG. 5 is a schematic block diagram of the distributed processor structure of the system as shown in FIG. 2 and also illustrating the processors of the electro-pneumatic control unit.

As understood with further reference to FIG. 5, the control subsystem 30 also preferably further comprises at least one other processor associated with the electronic brake valve 36 and the electro-pneumatic controller 38 and operatively connected to the first processor of the IPM 34. In the illustrated embodiment, the electronic brake valve 36 includes a second processor, and the electro-pneumatic controller 38 includes five processors 38*a*–38*e*.

In accordance with another advantageous feature of the invention, the first processor of the IPM 34, the processor of the EBV 36 and the five processors 38*a*–38*e* of the EPCU 38 include distributed processing means for providing a distributed control network as will be readily appreciated by those skilled in the art. The distributed processing means may be provided by commercially available processors and electrical transceivers or optical transceivers as also described in greater detail below. The distributed control network also provides for the detection, isolation and response to failures as extensively described below. Thus, reliability is also increased by the distributed control network defined by the multiple processors of the respective devices.

Returning agin briefly to FIGS. 2–4, the control subsystem 30 also preferably includes a trainline drive/sense interface 35 for interfacing to non-LSI compliant locomotives. The associated signals and parameters associated therewith are described in greater detail below. This feature of the invention permits the user to operate the control subsystem 30 in either LSI compliant or non-LSI compliant locomotives as will be appreciated by those skilled in the art.

Figure 6:
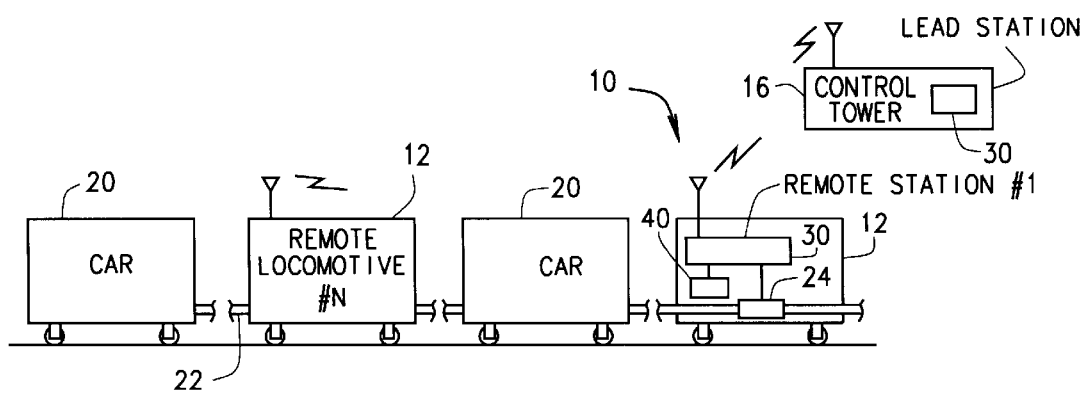
FIG. 6 is a schematic diagram of a portion of a train including the control system in accordance with the present invention and wherein a tower unit is the control point for all units the train.

As shown in FIG. 6, the train control system 10 can also be used wherein a control subsystem is installed at a tower location 16, and this subsystem is configured to operate as the lead unit. The locomotives 12 of the train are all equipped with control subsystems 10 configured as remote units as will be appreciated by those skilled in the art.

A method aspect of the invention is directed to a train control method for a train comprising a plurality of locomotives 12 and an air brake system 22, 24. Each locomotive 12 also preferably includes a locomotive control computer 40. The train control method preferably comprises the steps of: installing a plurality of control subsystems 30*b* in respective locomotives of multiple consists; configuring at least one of the control subsystems as a lead control subsystem; and configuring at least one other control subsystem as a remote control subsystem. Each control subsystem preferably comprises a radio transceiver 32, a first processor 34 connected to the radio transceiver for communicating with at least one other control subsystem, an electronic brake valve 36 connected to the first processor, and an electro-pneumatic controller 38 connected to the first processor and the electronic brake valve, for interfacing to the air brake system of the train. The first processor preferably comprises a locomotive computer interface for communicating both distributed power and electronic air brake signals with the locomotive control computer.

The control system 10 in accordance with the invention is designed to provide synchronous automatic control of one to four remote locomotive consists within a train. This control system is designed for all operational modes including traction (motoring), dynamic braking as well as air braking. The commands are generated by the operator using the master controller for throttle control and Electronic Brake Valve (EBV) 36 for air brake control in the Lead locomotive of the Lead consist. The motoring and dynamic braking commands are read by the system through the messages from the locomotive control computer (ILC) 40. Brake commands are direct input to the system via the EBV 36. These commands are relayed to the controlling unit of the remote consists via a radio link, where they are interpreted by the system. This in turn generates suitable DP and EAB commands for locomotives in each remote consist, which results in a synchronous automatic control of the locomotives in the remote consists. It is important to note that only one unit in each consist (Lead or Remote) is required to be equipped with the system. In addition to commands passed from the Lead to Remote units, the system also transfers status information from the Remote units to the Lead unit for display and monitoring purposes.

The system 10 of the invention performs two major functionalities. The first is the Electronic Air Brake (EAB)

functionality, which performs all the air brake functions on the entire train with multiple remote consists, including automatic, independent, bail off and emergency braking. It includes three modules: Integrated Processor Module (IPM) 34, Electro-Pneumatic Control Unit (EPCU) 38 and Electronic Brake Valve (EBV) 36.

The second major functionality is the distributed power (DP) functionality, which is an LSI compliant distributed power control system, capable of communicating with the Remote consists and the EAB sub-system. It includes the Radio Module (RM) 32, and its associated antennas.

The IPM 34 is the primary electronic controller for distributed power as well as electronic air brake functions. The IPM is typically located in the Nose Cab, mounted in the LSI equipment rack.

The EBV 36 is the Human Machine Interface (HMI) between the operator and the electronic air brake (EAB) system functionality. The operator commands the EAB through EBV. The EBV is typically located on the operator's desk in the Operator Cab of the locomotive.

The Electro-Pneumatic Control Unit (EPCU) 38 includes various electrical as well as electro-pneumatic components of the EAB functionality including pneumatic relays, drivers, solenoid valves and analog converters for the valves etc. The EPCU 38 is located in the brake bay (air brake compartment) of the locomotive.

The radio module 32 contains dual redundant VHF or UHF radios for data and command transmission between the lead and remote consists via the radio link. The RM is typically located in the Nose Cab and mounted in or near the LSI equipment rack. The antennas are typically located on the roof of the locomotive.

The operator screen settings are communicated to the system using Distributed Power remote session message and Air Brake Setup message. The operator's settings are entered into the displays using the Distributed Power and Air Brake Setup menus and configuration modes. The distributed power set up screens allow the operator to set up a given unit as a Lead or Remote and also allows one to set up the operating mode. The EAB setup screens allow the operator the choice of EAB primary mode (lead/trail, cutin/cutout) as well as Feed Valve setting for equalizing reservoir pressure and Freight/Passenger mode.

The Electronic Brake Valve (EBV) 36 is a dedicated physical HMI for the EAB functionality. It may be similar to the #30 desktop style brake valve. The EBV 36 may have separate controls for automatic and independent brakes. The EBV 36 may preferably include a backup method of emergency brake valve application, operational in case of complete electrical power failure.

The EBV 36 is capable of providing the automatic, independent and emergency brake (application and release) as well as bail off controls for the locomotive and automatic as well as emergency brake (application and release) controls for the train to the operator. The EBV 36 may have discrete positions for the following automatic brake settings: release, minimum reduction, full service, suppression, handle off (continuous service) and emergency. A provision for additional detents between minimum reduction and full service may be made, which will be available to the customer on an optional basis. The EBV 36 may be electronically and/or optically linked to the IPM. Various EBV settings will form a set of inputs to the EAB functionality.

A helper's emergency brake valve (HEBV) may be provided by a mechanical valve that directly vents the brake pipe through a 1¼" pipe when opened. The HEBV may be located on the helper's console and the piping arranged outside the operator's cab for noise minimization. The HEBV is capable of providing a 74 VDC signal to the IPM 34 to indicate the emergency brake application. One of the most commonly used methods for this function includes a secondary mechanical valve linked to the HEBV, which supplies the MR air pressure to a pressure switch (FVPS) to indicate emergency valve actuation. An alternate HEBV arrangement that includes a push button actuated pilot valve may also be provided, however the 74 VDC signal requirement must be satisfied.

The system variables are made available to the system from the Integral Locomotive Computer (ILC) 40 via the LSI Packet Switch. The Calendar/Time may be available from the locomotive master clock and passed onto the system to synchronize any time stamps that may be required.

Two discrete Cab Signal status inputs are made available to the EAB functionality from the cab signal suppliers. The Cab signal OK is held high while the Cab Signal device is functioning normally and not attempting to enforce a speed restriction. If the Cab Signal device decides to enforce a speed restriction by commanding a penalty brake application, it will set the Cab Signal OK signal to low. In the event of Cab Signal malfunction or a power failure to it, this signal will also turn low. The EAB system shall respond to the Cab Signal low input by application of the penalty brake. The Cab Signal Unit maintains the penalty holdoff lines between 24 VDC to 32 VDC to prevent penalty brake application. The IPM may apply the penalty brake when the lines drop below 20 VDC.

The system receives 10 numerous LSI Class B messages from ILC 40 and display devices. Messages are also exchanged internally between the DP and the EAB functionalities. Some of the messages serve as inputs to the system.

For example, the Cab Signal Cut In/Cut Out Status message contains the bits that specify the status of the Cab Signal as Cut In or Cut Out for Suppressible and Non Suppressible penalties. The EOT Status messages serve as inputs to the EAB functionality. The one way EOT message is sent to IPM to provide the brake pipe pressure at end of train. The two way EOT message is sent to IPM to indicate emergency brake application.

The Penalty Brake Request message is sent from the ILC 40 to the IPM 34 once every second. This message contains a bit that indicates whether the penalty brakes are to be applied or withheld. The ILC 40 generates this message based on the status of the Alerter, Overspeed Indicator and Cab Signal System. The message also contains the information on the penalty source. This message is also used as a keep alive message between ILC and EAB functionality. If EAB functionality does not receive any such message for 15 seconds from the ILC, it initiates a penalty brake application.

Another class of message inputs includes radio messages, which are exchanged between the Lead unit and Remote units for distributed power functionality. These messages are internal (proprietary) to the system and are not LSI compliant.

Electrical Inputs are the digital inputs (74 V logic) to the system that indicate various distributed power and braking states. The DB Interlock (BGTL) input to the EPCU indicates the application of the dynamic brakes of the locomotive. When the locomotive control system energizes this input to 74 VDC, the IPM 34 bails off any automatic application of the air brakes on the locomotive consist. Two types of DB interlocks may be used wherein the locomotive brakes reapply after the DB Interlock signal has been de-energized, and Type II wherein the locomotive brakes remain bailed off after the DB Interlock signal has been de-energized.

A penalty or emergency brake application de-energizes the Power Knock Out (PCS) relay on the locomotive, disabling the traction and dynamic brake functions and allowing the automatic brakes to apply. The Helper's Emergency Brake Valve (FVPS) input is energized to 74 VDC upon application of the emergency brakes from Helper's Emergency Brake Valve. It is functional for both powered as well as unpowered modes of the EAB functionality.

The Cab Signal Penalty (CSP1 and CSP2) is energized to 24 VDC to 32 VDC when the cab signal device is not requesting a penalty brake application. The Reverser (REV) 74 VDC input is required to verify whether the reverser on the locomotive is centered. (Note: In trail mode, the reverser needs to be centered. If the reverser is moved from center, then EAB configuration mode shall change to lead cut out.) When the reverser is centered, this input is low.

The Binary Output Disable (DOD) 24 VDC IPM input is energized by EPCU, upon the loss of "heartbeat" from IPM to EPCU. When BOD input is activated, PCS and PIR outputs from the IPM are disabled.

A number of pneumatic inputs are also provided. The system requires pneumatic power for EAB operation. This power is made available in form of clean, dry, pressurized air from the locomotive air system to Main Reservoir #2 (MR2) for air brake operation. The air supply is used to supply air to the following pipes of the EAB functionality:

Brake Pipe 22 is a continuous pipe that typically runs from the Lead locomotive of the Lead consist to the last car in the train. The EAB functionality of the Lead locomotive charges the Brake Pipe in each car. The automatic service brake and emergency brakes are controlled by controlling the air pressure in this pipe.

Application & Release (A & R) Pipe (20 Pipe) typically runs throughout the locomotive consist. The Lead locomotive of the Lead consist controls the Independent Brakes on the locomotive consist by controlling the air pressure in this pipe.

Actuating Pipe (13 Pipe) runs throughout the locomotive consist. When the Lead locomotive of the Lead consist pressurizes this pipe with air, the automatic and/or emergency brakes on the locomotive consists are released (Bail Off).

MR Equalizing Pipe: the air supply is required at various times to supply air to the MR Equalizing Pipe whenever the air pressure in the Main Reservoir of the Lead unit rises above the existing pressure in the MR Equalizing Pipe.

Various electrical output signals are required from the system 10 to perform distributed power and electronic air brake control related tasks. These tasks include control of electro-pneumatic devices for air pipe pressure regulation, communication with integrated locomotive computer (ILC) 40 as well as the Remote units and control of various electro-mechanical devices for electrical trainline control. These outputs include Emergency Magnet Valve, Emergency Sanding, Visual Alarm (TL2), and Power Knock Out (PCS).

The Emergency Magnet Valve (EMV) output is activated to "high" (74 VDC) by IPM upon any emergency brake application. The output is initially de-energized upon power up or reset condition. It is asserted (to "high") when the IPM is linked and enabled or Lead enabled in Tower Control mode for LSI application (for non-LSI applications, Lead enabled in speed control or tower mode). Once asserted, this output is deactivated (to "low") immediately if the IPM 34 becomes unlinked, not a remote or disabled or has a critical failure. This output is deactivated immediately upon a communications loss to the protocol translator/packet switch for more than 5 seconds on DP HDLC link.

The Power Knockout (PCS/COR) output when active (low), drops out the PCR relay on the locomotive so that the main alternator is not powering the traction motors during brake applications. The Visual Alarm (TL2) (VA) output when activated (to logic "high"), energizes trainline 2 on the locomotive consist to ring an alarm on all units within the consist. The Independent Brake Switch (IBS) output when asserted (to "high"), removes the dynamic brake application is "locally". (Trailing units are not affected.)

The Brake Cylinder Pressure Switch (BCPs) output when asserted (to "high"), causes BGTL to no longer control the brake cylinder. This is used for removal of dynamic brake on the trailing locomotives. The Rail Lubricator Inhibit Switch (RLIS) output when activated (to logic "high"), inhibits the rail lubricators are inhibited. This output is activated upon each brake application.

The Emergency Sand (ES) output is activated during emergency brake application. When this output is activated, it provides sanding by actuating the sanding magnet valves on the locomotive. The class of Pneumatic Outputs signals includes air flow in the Brake Pipe (BP), #13 (Actuating) Pipe, #20 (Independent Application and Release) Pipe and Brake Cylinder (BC).

The Trainline Control Outputs provide actuating signals for various electro-mechanical devices such as relays to control the locomotive trainlines (for Non LSI locomotives only). These signals are external to the system, The class of Message Outputs includes two main categories. The messages such as fault messages, crew messages, health report messages and set up parameter messages are communicated to the integrated locomotive computer (ILC) 40 system and are external to the system. These messages adhere to LSI class B protocol. The other category of messages are radio messages which are exchanged between the Lead consist and Remote consists for distributed power functionality. These messages are LSI compliant.

The Integrated Processor Module (IPM) 34 serves as a primary electronic controller for both distributed power, as well as electronic air brake functions. The IPM is also responsible for the system's transitions from one operating mode to another. The system mode and the individual remote modes determine how each remote unit responds to the lead unit's throttle state, air brake conditions, and other operator inputs. The Mode screen is used to set the system operation mode for idle or run.

When the system is set to the Run mode of operation, all the active remote units perform traction, dynamic brake and air brake functions. The remote mode may override this operating mode for a specific remote unit. In the RUN mode, all screens display RUN in the upper left corner. The EXECUTE key is pressed to change the operating mode, except to enter the system IDLE mode.

The Independent Mode feature is operable only in the Run mode. The independent control function is controlled via the DP screen. Initially, the system is configured with all remote units in the front group and controlled from the lead unit throttle. When the engineman requires the independent mode of operation, he presses the MOVE TO BACK key.

This causes the last remote unit in the train to be (1) placed in the back group of remote units, (2) initialized to the current setting of the lead unit, (3) controlled via the IDLE, BRAKE, TRACTION and MORE and LESS keys.

Additional remote units can be reassigned from the front group to the back group by pressing the MOVE TO BACK key. A remote unit can be reassigned from the back group to the front group by pressing the MOVE TO FRONT key. The OPERATION screen continues to display both the front and back throttle positions. While the front and back groups are both in the Traction mode or both in the Dynamic Brake mode, a single press of the FRONT or BACK switch results in a consist reassignment.

The back group MORE and LESS keys can be used to increase or decrease the traction or brake step of the units in the back group. The back IDLE, TRACTION and BRAKE keys can be used to select idle, traction or dynamic braking for units in the back group. The traction or braking of units in the front group is always controlled from the lead unit's throttle.

When the Reverser is in the Forward direction and the front group is in the Dynamic Brake mode and the back group is in the Traction mode, the following sequencing occurs when re-assigning units between the front and back groups. The operator presses the MOVE TO FRONT key to initiate the back-to-front transition. The selected remote steps down in traction. When it reaches idle, it pauses. The Operation screen indicates the front group is in the dynamic braking mode, the selected remote is in idle and the back group is in the traction mode. When the operator requires additional braking at the head end of the train, he again presses the console's MOVE TO FRONT key. The selected remote configures for dynamic braking and advances the step to match the lead unit. The Operation screen indicates that the selected remote is operating in the Brake mode.

Having the front group in the Traction mode and the back group in the Brake mode is not permitted when the reverser is set to Forward. Similarly, having the front group in the Brake mode and the back group in the Traction mode is not permitted when the reverser is set to reverse.

The engineman controls the back group throttle from the Control Console's MAIN screen using the scheme of TABLE 1.

TABLE 1

Backgroup Operating Mode

| Backgroup Operating Mode | Description |
|---|---|
| IDLE | Sets the remote consists in the back group to idle. The action is immediate. It is not necessary to press the EXECUTE key. |
| TRACTION | The EXECUTE key must be pressed to execute this command. If the remote consists in the back group are in the idle mode or traction mode, this sets them to Traction Step 1. If the back consists are in the dynamic brake mode, this reduces the braking to idle, delays for 10 seconds, then sets to Traction 1. |
| BRAKE | The EXECUTE key must be pressed to execute this command. If the remote consists in the back group are in the idle mode or dynamic brake mode, this sets them to Dynamic Brake Step 1. If the back consists are in the traction mode, this reduces the throttle to idle, delays for 10 seconds, then sets to Dynamic Brake 1. |
| MORE TRACTION/ MORE BRAKE | Pressing this key increases the traction or dynamic brake step of the back consists. If the idle mode was selected, the key has no effect. The action is immediate. It is not necessary to press the EXECUTE key. |
| LESS TRACTION/ LESS BRAKE | Pressing this key decreases the traction or dynamic brake step of the back consists. If the idle mode was selected, the key has no effect. The action is immediate. It is not necessary to press the EXECUTE key. |

A Tower Control mode permits the control of the throttle and air brakes of the lead unit and all active remotes from the Tower System. The Remote mode modifies the tower control commands as in the System Idle, and Run modes. The train must be stopped to enable the Tower Control mode. The operator selects the TOWER mode from the lead unit MODE screen. After the EXECUTE key has been pressed, the system applies the Independent brakes and commands all locomotives to idle. When the unit number of the lead unit has been entered into the Tower Control System and the LINK key on the Tower Control unit has been pressed, the radio messages to establish control from the tower to the lead unit begin. When the tower issues system valid commands, these are received by the lead unit. It performs the requested functions and relays the commands to its active remotes.

While in Tower mode, if the train exceeds 12 m.p.h., the penalty brake is applied. The system remains in the Tower Control mode until the tower operator initiates an Un-Link sequence or the operator re-activates another mode from the lead unit MODE screen. Upon unlinking from the Tower unit, the System initiates a service Rate Brake Application to 0 psi.

The REMOTE Menu of the operation screen is used to select reduced modes for the individual remote units. These modes override the system operating mode. The Remote Menu of the operation screen is selected by pressing the REMOTE MENU key on the OPERATION (left display). The remote operating modes are described below in TABLE 2.

TABLE 2

Remote Operating Mode

| Remote Operating Mode | Description |
|---|---|
| NORMAL | All remote traction and dynamic brake functions are enabled for control. All remote air brake functions are enabled and the brake valve may be cut in. |
| IDLE | The remote throttle remains in idle. All remote air brake functions are enabled and the brake valve may be cut in. |
| BV OUT | All remote traction and dynamic brake functions are enabled for control. The Emergency and Independent air brake functions are enabled for control. The |

TABLE 2-continued

Remote Operating Mode

| Remote Operating Mode | Description |
| --- | --- |
| ISOLATE | remote automatic air brake functions are inhibited by cutting out the brake valve. The remote throttle remains in idle. The remote's emergency air brake application function and independent brake functions are enabled for control. All other air brake functions are disabled and the brake valve is cut out. |
| Set OUT (S/O) | The remote's throttle remains in idle. The remote's Emergency Brake application is enabled for control. The Independent Brakes are set to maximum pressure. All other air brake functions are disabled and the brake valve is cut out. |
| STOP | The remote's throttle is set to Engine Stop (train-line stop). All other remote functions are as in ISOLATE. |

The Select Remote key can be used to select one of the remotes. Once selected, the remote's mode can be changed by pressing one of the mode keys followed by the EXECUTE key.

Both configuration and braking EAB modes are controlled by the IPM based on operator's inputs through EBV, EAB set up screens and the commands received from the locomotive control system.

Lead Cut In mode is the normal operating mode of the EAB functionality. In this mode, the operator of the Lead locomotive of the lead consist has the control of electronic air brakes on the lead locomotive, all the locomotives of the Lead as well as Remote consists and the train brakes of all the freight cars. In this mode, the operator has the ability to actuate the electronic air brakes on the entire train using the automatic braking mode or the brakes on only the locomotive consists using the independent braking mode. It is also possible that the IPM may initiate enforcement braking on the train in the Lead Cut In mode based on the commands and/or information from the locomotive control system.

The IPM 34 is capable of actuating automatic brakes (service as well as emergency) and independent brakes in any possible sequence or combination when in the DP Mode Control. The IPM 34 and EBV 36, in conjunction, control the actuation of automatic brakes and independent brake when in EAB only operation. The IPM 34 is responsible for configuration mode transitions (lead cut in/lead cut out/trail etc.) The IPM generates appropriate ER target pressure when in DP Mode Control and shall monitor and/or override the EBV when in EAB only operation for penalty applications and fault detections.

The automatic brakes apply brakes on the entire train including all the locomotives in Lead and Remote consists as well as the freight cars. These brakes are controlled by the operator using the automatic brake handle of the Lead unit. The IPM and EPCU receive the automatic brake handle ER target position input from the EBV on the Lead Unit. The EPCU reduces the equalizing reservoir as well as brake pipe and consequently develops brake cylinder to obtain the desired braking effort. The EPCU receives the ER target from the IPM on the Remote unit to control the desired braking effort.

The brake pipe pressure at full release shall be adjustable between 60 to 110 psi in 1 psi increments. This pressure is set using the Air Brake Set Up screen on operator's display. The EPCU 38 maintains the brake pipe pressure within +/−1½ psi of the desired value through the entire brake pipe pressure range, with a ³⁄₁₆" orifice fitted to the back end of the locomotive brake pipe. (This ensures that the system is capable of maintaining the brake pipe pressure at any release setting with less than 1 psi drop against a leak of 60 SCEM.)

The minimum brake pipe pressure reduction from any release setting is 5 to 7 psi. A full service brake pipe pressure reduction is approximately 26 psi. The service equalizing reservoir rate of pressure reduction is variable dependent on release pressure from 4–5 psi/sec @ 70 psi release pressure to 6–7 psi/sec @ 110 psi release pressure. The suppression position is provided for suppressing specific penalty brake application and the brake pipe pressure is maintained at full service level. In the Handle Off (Continuous Service) position the equalizing reservoir pressure is reduced to 0 psi at the service rate. (In practice, the final brake pipe pressure may be in 7 to 13 psi range.) In emergency position, the brake pipe is vented to zero psi at fastest rate attainable and the EPCU shall discontinue charging of the brake pipe. EPCU 38 interprets any brake pipe pressure reduction rate of 10 psi per second or faster as emergency brake application.

At full release, the brake cylinder pressure is typically below 0 psi. For minimum reduction position, the brake cylinder pressure shall be in 9 to 14 psi range. The brake cylinder pressure in the service range (greater than 25 psi brake pipe) is proportional to the brake pipe pressure reduction to a developed maximum set service limit. When brake pipe pressure reduces below a minimum pressure (approx. 19–25 psi) a predetermined set emergency brake cylinder pressure occurs relative to the initial release pressure.

For service and emergency brake applications, the EPCU 38 is capable of commanding an increase in the brake cylinder pressure at 6 to 7 psi per second in freight applications and 9 to 10 psi per second for passenger applications. These rates are applicable from 0 to the full brake cylinder pressure development range. The EPCU 38 is capable of commanding a decrease in brake cylinder pressure at 6 to 7 psi per second rate for automatic brake releases for both freight and passenger modes. This rate is applicable from maximum brake cylinder pressure down to 5 psi. In case of IPM failure, EPCU 38 is capable of developing suitable brake cylinder pressure from EBV input.

The independent braking mode applies the brakes on the entire locomotive consist including Remote consists. These brakes are controlled by the operator using the automatic brake handle of the Lead unit. The IPM 34 and EPCU 38 receive the independent brake handle independent target from the EBV on the Lead unit. The EPCU 38 develops the A&R Pipe pressure accordingly and consequently develops brake cylinder to obtain the desired braking effort. The EPCU 38 receives the independent target from the IPM on the Remote unit to control the desired braking effort. The independent brake application and release shall be graduated. The behavior of the EAB in the independent braking mode is dependent on the state of automatic brakes on the locomotive consist.

If the automatic brakes are released, when independent brake application is made, then the A & R pipe pressure shall range from 0 to 45 psi corresponding to release and full application. This range in turn translates to 0 to 72 psi range for brake cylinder pressure. The A & R pipe pressure to BC pressure ratio is configurable. (In an optional system, full application corresponds to 50 psi A& R pipe pressure and 80 psi brake cylinder pressure.)

The EPCU 38 is able to increase each of the A&R Pipe pressure and the brake cylinder pressure in response to A&R Pipe on a single locomotive at a minimum rate of 45 psi/sec each increasing and decreasing throughout the pressure range.

The independent brake may not be bailed off. The automatic and independent brakes are not fully additive. A higher level of service and emergency braking shall prevail with an additive 60% of A&R Pipe pressure. If a bail off is requested, while automatic and independent brakes are simultaneously applied, the brake cylinder pressure shall be reduced to the level called for by the independent brake. If automatic brakes have been applied in service range, the operator may use the independent brakes to increase the braking effort on the locomotive consist while maintaining the braking effort on the train constant. In case of IPM failure, EPCU 38 is capable of developing suitable brake cylinder pressure from EBV 36 input. Enforcement braking includes either the Penalty Brake mode or the Emergency Brake mode. A Penalty brake application is a service brake application of automatic train brakes, with brake pipe venting to zero psi at the service rate. If the penalty is suppressible, then the operator may halt the reduction of equalizing reservoir, and consequently brake pipe, before it is completely vented by placing the EBV automatic handle into suppression position until the IPM actually clears the penalty. The brake pipe may then be charged.

If the penalty is not suppressible, then the IPM will not allow the penalty to be reset until the brake pipe has been vented to zero psi and the penalty request has been removed. The automatic brake handle can be then placed in suppression position to allow IPM to clear the penalty.

The locomotive control computer (ILC) 40 commands penalty brake application to the IPM 34 by sending the penalty brake command message (197/66) once every second. This message contains a status bit that indicates whether the penalty brakes should or should not be applied. If IPM 34 does not receive a penalty brake message for 15 second, it assumes communication link failure and automatically initiates a penalty brake application. IPM 34 also responds to penalty brake requests from the cab signal unit.

In the Emergency mode, the brake pipe is vented to zero psi at an uncontrolled rate, immediately upon the receipt of emergency command. The EPCU considers any rate greater than 10 psi per second of brake pipe pressure reduction to be an emergency brake application. After emergency brake application, the EAB functionality must remain in an emergency state for at least 60 seconds before it can be reset. Following an emergency brake application, the automatic brake handle must be placed in the emergency position before recovery can occur. Emergency brake application is available in any mode as long as the brake pipe is charged to 45 psi.

The operator may release any automatic or emergency application of the air brakes on the locomotive consist, while retaining the brake application on the freight cars by bailing off the locomotive brakes. The bail off command is generated by an operator using the bail off lift ring of the EBV. A bail off request is transmitted to the trailing locomotives through a pneumatic signal using the Actuating pipe (#13). Upon the receipt of the bail off request from the EBV or the IPM on a Remote unit, the actuating pipe is pressurized to the main reservoir pressure by the EPCU 38 and shall release any brake cylinder pressure due to automatic brake application, each service and emergency braking. The emergency brake reapplies on release of the bail request. The service brake does not reapply.

The EPCU 38 bails off automatic brakes when the actuating pipe pressure is at a critical pressure setting in the range of 23 to 27 psi (25 psi, typical). If automatic and independent brakes are concurrently applied and bail off is requested, the brake cylinder pressure is reduced to that called for by the independent brakes. In case of the disruption of the electrical power to the system, the EPCU 38 exhausts any pressure in the actuating pipe to prevent locomotive brakes from being bailed off.

In Lead Cut Out mode, the locomotive is cut out of charging the brake pipe, even though it may be leading the train. This mode is primarily useful for running the brake pipe leakage test. In this mode, the unit cannot charge or control brake pipe pressure. The operator has control of independent as well as emergency brakes.

In Trail mode, neither the IPM 34 nor EPCU 38 responds to operators commands through EBV except an emergency brake application. In this mode, the EPCU 38 responds to the automatic brake commands from the lead unit received through the brake pipe, independent brake commands through the A & R pipe and bail off commands through the actuating pipe. If automatic and independent brakes are applied simultaneously, then the EPCU responds to the pipe requesting higher cylinder pressure. The rates at which the EPCU 38 adjusts the brake cylinder pressure are identical to the Lead Cut In mode as described above.

The back up mode is entered in case of the loss of power to the system. If the system is functioning in lead cut in (EAB) mode, and loses power, the EPCU automatically applies penalty brakes, reducing the ER and BP pressure to zero psi at service rate. (In practice, BP pressure is usually between 7 to 13 psi.) Trainline alarm is activated as long as power loss is not due to the loss of the locomotive battery input (tripped circuit breaker). The EPCU and EBV use Trainlines 13 and 4 as power back up for automatic brake bail off and dynamic brake bail off.

If the system is in Trail mode, loss of power does not affect the brake pipe pressure and brake pipe pressure changes in response to the brake pipe changes generated in the lead unit. An emergency brake application is available in any mode, provided that the brake pipe is charged to at least 45 psi.

The EPCU 38 controls the EAB functionality modes to meet the following timing criteria. All timing requirements are with reference to initial movement of the EBV handle. The timing requirements are described in TABLE 3 below.

TABLE 3

Timing Requirements

| Pressure | From | To | Time (seconds) |
|---|---|---|---|
| Equalizing Reservoir | Release (110–70) | 20 psi less than Release | 3.5 to 7 |
| Brake Cylinder (service) | 0 psi | 50 psi | 5.5 to 7.5 |
| Brake Cylinder (service) | Maximum Pressure | 5 psi | 7 to 7.5 |
| Brake Cylinder (emergency) | 0 psi | 50 psi | 5.5 to 7.5 |
| Brake Cylinder (emergency) | Maximum Pressure | 5 psi | 11.5 to 13 |
| Brake Cylinder (service quick release - Bail Off) | Full service Pressure | 5 psi | 4 to 6 |
| Brake Cylinder (service quick release - DBI) | Full service Pressure | 5 psi | 4 to 6 |
| Brake Cylinder (Independent) | 0 psi | 70 psi | 1.5 to 2.5 |
| Brake Cylinder (Independent) | Maximum Pressure | 5 psi | 1.5 to 2.5 |

Each remote unit must be set-up to enable distributed power operation. This is accomplished via the right display unit. Pressing the DIST POWER key opens a 'remote session' window per figure A-3.

The locomotive number of the lease unit must be entered using the COUNT UP, COUNT DOWN, DIGIT LEFT, and DIGIT RIGHT keys. The railroad code for that unit may also be entered using the same keys. If the railroad code field is left blank, this remote unit can be linked to and controlled by any lead unit having the specified unit number. The OPPOSITE DIRECTION/SAME DIRECTION key must be used to define the locomotive direction relative to that of the lead unit. When the ACCEPT key is pressed, the brakes are applied and the system waits for a radio message for linking to the lead unit.

The lead unit must be linked to each remote consist to be used in the train. Pressing the LEAD SET-UP key on the main menu causes the lead set-up screen to be displayed. The screen initially prompts for the unit number of the first remote locomotive, Unit B. The operator enters this via the COUNT-UP, COUNT DOWN, DIGIT LEFT and DIGIT RIGHT keys. When the four digit unit number of the first remote has been entered, the operator presses the LINK key to initiate the required radio message sequence. The screen displays the state of the linking process. This may be: Unlinked, Linking, Link fail, Linked, Testing, OK, or Radio fail.

One to six remotes can be linked as described above. The system can be unlinked by pressing the UNLINK key. When all remotes have been linked, the operator should press the ACCEPT key. If no link fail conditions are reported, the system advances to the SYSTEM screen. Note that a radio fail condition does not prevent system operation. At this time, the distributed power operation page is displayed on the left screen.

The SYSTEM screen A-9) is used as follows: to initiate the brake pipe continuity test, to initiate the brake pipe leakage test, to enable the train check test, to unlink the system, or to view the system log data. This screen is displayed immediately after system linking and is also selectable from the Main Menu.

The brake pipe continuity test must be performed after the system has been linked and before the train may be moved. The test automatically performs the following: verifies that the remote units are all connected in the same train, verifies that the air flow sensor on each remote units is functional, determines the relative locations of the remote units, and prepares the system for normal operation. The results of the test are displayed on this screen.

To perform the BRAKE PIPE TEST, the operator must set the independent brakes to maximum and charge the train brake line. These two actions can be initiated by first moving the INDEPENDENT BRAKE handle to the full application position, and then by moving the AUTOMATIC BRAKE handle from the EMERGENCY position to the RELEASE position. Once the Automatic Brakes have been released, the lead unit begins charging immediately. Each remote begins charging when an increase in its brake pipe pressure is sensed. The operator may advance the throttle on all units as required to increase the compressor output.

When the brake system has been sufficiently charged and the charging flow rates are stable, the BRAKE PIPE TEST key is displayed. The operator presses the BRAKE PIPE Test key, causing the BRAKE PIPE TEST legend to flash, and the EXECUTE and CANCEL keys to light. The operator is prompted to initiate a minimum brake pipe pressure reduction by moving the AUTOMATIC BRAKE handle to the minimum service position. Each remote unit monitors its charging flow rate to detect a significant increase. When the increase in the charging flow rate caused by the lead unit's brake reduction is detected, it transmits a message to the lead. The remote duplicates the reduction. All remotes must detect and report this flow increase within 30 seconds. If the test is not successful, a test fail condition is reported. After the train set-up or equipment failure is corrected, the brakes must be released and the test must be run again. On the successful completion of the BRAKE PIPE TEST, the System Mode advances to IDLE.

The brake pipe leakage test may be initiated from the SYSTEM screen after the successful completion of the brake pipe test. It uses the industry-accepted pressure drop method. The actual pressure drop obtained is recorded by data logger and displayed on the SYSTEM screen. The leakage test is not required whenever the system is linked. FRA and railroad rules dictate when a leakage test is required.

The engineman initiates the test by pressing the LEAKAGE TEST key switch on the console's system screen, followed by the EXECUTE switch. If the following conditions are met, the test proceeds: the system mode is idle, the engineman must verify that the lead's brake pipe pressure is within 5 psi of the equalizing reservoir pressure. He must also verify that the brake pipe pressure at the rear end of the train is within 15 psi of the lead's brake pipe.

The system then initiates a 20 psi application at both the lead and remote units. After the brake pipe pressure stabilizes, the system allows one minute for the pressure to equalize through the train. The system then cuts out the Brake Valve at all the lead and remote units. Note that cutting out the Brake Valve is performed via the Electronic Air Brake. The brake pipe pressure at each unit is monitored during the next 60 seconds. The test result is displayed on the System screen and the leakage values are recorded in the data logger. If the test fails, the leakage should be corrected and the test repeated. This air brake condition is held until the engineman initiates a full service application, followed by a brake release.

A "Train Check" feature is incorporated into the DP system. It verifies the continuity of the air line, without testing the air flow sensor. The check is initiated by the engineman when needed and causes a small delay in the train brake release action, but it requires less time than the Brake Pipe continuity test.

Whenever the train speed is <0.5 and the automatic brakes are applied (after the Brake Pipe Test is successfully completed), a key on the DP system screen is enabled as TRAIN CHECK. When the engineman wishes to perform the check, he presses the key. The key legend flashes and the EXECUTE and CANCEL keys light. When he presses the EXECUTE key, the flashing TRAIN CHECK legend is removed. At this time all the remote brake valves are cut out. Remote units in other modes are not affected. When an automatic brake release is initiated by the operator, the DP lead unit commands each remote unit to its previous mode.

The brake release begins at the lead unit. As it progresses through the train, each remote senses the Brake Pipe pressure rise and cuts in its brake valve. Remote throttle functions can be used to begin moving the train while the release progresses through the train. If all remote units sense the 4 psi Brake Pipe pressure within 75 seconds, the air line continuity has been verified and a crew message, TRAIN CHECK OK, is displayed for one minute. If all remote unit fails to sense the pressure rise within 75 seconds of the release, a failure is declared. A crew message, TRAIN CHECK FAIL, flashes until a brake application is made. The chime also sounds three times (major alarm).

The TRAIN CHECK key must be pressed each time the train check is to be performed. The results of each train check are displayed on the system screen and are recorded in the maintenance logger.

The Brake Pipe/Flow Sensor Test is required prior to any remote traction or dynamic brake control. The test is summarized as follows. After all remotes are linked, the engineer presses the ACCEPT key on the SETUP screen to advance to the SYSTEM screen. The system is declared 'linked'. If the lead independent brake handle is not set to maximum, "Set independent brake handle to FULL before charging train" is displayed in the crew message block. Proceed when the independent brake handle is set to >80%. When the penalty timer has expired and the EAB penalty has cleared, the crew message block displays "Charge train before running BRAKE PIPE test.

The engineer releases the automatic brakes by cutting in the lead unit brake valve (if necessary) and moving the automatic brake handle from emergency to release. The lead brake valve begins charging immediately. The remote brake valves cut in and begin charging when the B P pressure rise is sensed. The text message is displayed in the message block: "Charging train, Waiting for air line stabilization". If valid EOT brake pipe pressure data is available: Two minutes after all charging rates are less than 60 cfm and the EOT brake pipe is within 15 psi of the lead B P pressure, enable the BRAKE PIPE TEST key on the SYSTEM screen and sound a single chime.

If valid EOT brake pipe pressure data is not available, the two minutes after all charging rates are less than 60 cfm, display "Press BRAKE PIPE TEST when end of train pressure is ## psi or more" in the crew message block. The value '##' is equal to the feed valve pressure less 15 psi. Enable the BRAKE PIPE TEST key on the SYSTEM screen and sound a single Chime. When the engineer presses the BRAKE PIPE TEST key, the crew message block displays "Set automatic brake handle to minimum". After the first service application is initiated by the engineer, the IPC enters the TEST mode, and waits for the remote unexpected flow, responses. The display in the message block changes to "Brake pipe test in process". If a greater than first service application is made, the test mode is canceled and the remote units begin following the lead brake handle commands.

The test can be canceled by (1) pressing the screen CANCEL key or (2) moving the automatic brake handle from the first service position. If the test is canceled via the brake handle, all units begin following the commands from the lead auto brake handle and the screen displays "Charge train before running BRAKE PIPE test".

If the test is canceled by pressing the CANCEL key, all units begin following the lead brake handle position. The LSI screen displays "Charge train before running BRAKE PIPE test". If the test fails, the LSI screen displays "BRAKE PIPE test fail", "Check train air line ahead of remote units XXXX, YYYY etc." in the message block, and the system maintains the brake condition. In this message, 'XXXX', 'YYYY' etc. are the unit numbers of the remotes which did not report the expected flow increase. As above, the failed test can be canceled via the auto brake valve or the CANCEL key. If the test is passed, the screen BRAKE PIPE TEST key is eliminated, the LEAKAGE TEST key is enabled and the LSI message block is cleared.

When the LEAKAGE TEST key is pressed, it flashes and the EXECUTE and CANCEL keys are enabled. When the EXECUTE key is pressed, the EXECUTE key is disabled and an automatic application of 20 psi. (total) is initiated. The CANCEL key remains enabled. [If a 90 psi. feed valve setting is used, the EQR & BP are reduced to 70 psi.] The crew message block displays "Leakage test: Air line stabilization". After the brake pipe pressure stabilizes, 60 seconds is allowed for further pressure stabilization.

Throughout the leakage test, the test can be canceled by (1) pressing the CANCEL key or (2) moving the brake handle to a full service application position. If the test is canceled by either method before the brake valves are cut out, a full service application is initiated via the lead and remotes. The LSI screen message block displays "Set automatic brake handle to FULL service". When the handle is moved to full service, the test mode is terminated. If the test is canceled by either method after the brake valves are cut out, a full service application is initiated via the lead and remotes. The crew message block displays "Brake valves out, Set automatic brake handle to FULL service". When the handle is moved to full service, the screen prompt changes to "Brake valves out, Release automatic brake when ready". When the handle is moved to release, the test mode is terminated.

The lead and remote brake valves are then cut out. The crew message block displays "Leakage test: Brake valves out". An additional 60 seconds are allowed for pressure stabilization. The LSI screen displays "Leakage test: Brake valves out, Timing". The lead unit and each remote measures the drop in brake pipe pressure during the next 60 seconds. This pressure drop is normally logged at each unit. The pressure drop for each unit is displayed on the SYSTEM screen.

The test ends with the lead brake handle in release or first service. A 20 psi brake application (or more) exists on the train. The lead brake valve control (Air brake setup screen) is IN, but all brake valves are actually cut OUT. The screen displays "Brake valves out", "Set automatic brake handle to FULL service". When the handle is moved to full service, the screen prompt changes to "Brake valves out", "Release automatic brake when ready". When the handle is moved to release, a brake release is commanded and the lead brake valve is cut in. Control of the lead unit brakes if returned to the Air brake system. The remote brake valves cut in normally upon sensing pressure rises.

A Train Check feature is incorporated into the DP system. It verifies the continuity of the air line, without testing the air flow sensor. The check is initiated by the engineman when needed and causes a small delay in the train brake release action.

Whenever the train speed is <0.5 and the automatic brakes are applied (after the B P TEST is successfully completed), key 3 on the DP system screen is enabled as TRAIN CHECK. When the engineman wishes to perform the check, he presses the key. The key legend flashes, and the EXECUTE and CANCEL keys light. When he presses the EXECUTE key, the flashing TRAIN CHECK legend is removed. At that time all remote units in normal mode are temporarily set to the BV-out mode to cut out all the remote brake valves. Similarly, all remote units in idle mode are temporarily set to the isolate mode. Remote units in other modes are not affected. When an automatic brake release is initiated, the DP lead unit commands each remote unit to normal (or its pre-existing limited) mode.

The brake release begins at the lead unit. As it progresses through the train, each remote senses the BP pressure rise and cuts in its brake valve. Remote throttle functions can be used to begin moving the train while the release progresses through the train. If all remote units sense the 4 psi. BP pressure rise within 75 seconds, the air line continuity has been verified and a crew message, TRAIN CHECK OK, is displayed for one minute. If any remote unit fails to sense the pressure rise within 75 seconds of the release, a failure is declared. A crew message, TRAIN CHECK FAIL, flashes until a brake application is made. The chime also sounds three times (major alarm).

The TRAIN CHECK key must be pressed each time the train check is to be performed. The results of each train check are displayed on the system screen and are recorded in the maintenance logger.

Relating to System Communications, the method of linking the lead unit to its remote units incorporates the following key features: unique, non-duplicated address codes in all messages to preclude the unintentional linking to multiple remote units, system linking using standard locomotive numbers for ease of set-up, linking of the remotes one at a time for simplicity, verification of the alternate radios, and automatic unlinking after sustained communication loss.

On power-up the system is unlinked. To establish a radio path for commands and status, the following linking process is used. Each remote unit is set up for DP operation. The locomotives are set as "consist lead units" with the automatic brake valve handle in the release position. The link to unit number on the remote setup screen of each remote is set to the unit number of the lead locomotive. The radio circuit breaker is set to ON. When the air brake equipment is cut in, the unit applies the air brakes and is ready for linking.

The lead unit is also set up as a "consist lead unit". Using the LEAD SETUP screen, the engineman enters the number of the first remote locomotive. When he presses the LINK key, the lead unit transmits a message containing its unit number and the unit number of the remote to be linked. This message also contains the unique address code of the lead station. If this link message is properly received by the targeted remote unit, it enters a preliminary link state and stores the address code of the lead unit. It also transmits a link reply message containing the unit numbers and the address code of the remote station. If this link reply message is properly received by the originating lead unit, it stores the address code of the remote station and declares the link state with that remote. It then begins exchanging regular command and Status messages with that remote. This completes the linking sequence at the remote. During the linking process, all real-time clocks are synchronized with the lead real-time clock. The system tests all four radios and informs the engineman of the results via the SETUP screen. When the engineman see the OK message on the SETUP screen, he/she proceeds to enter the number of the next remote and similarly link it. Each remote is linked individually such that a linking error or failure is quickly detected and may be immediately corrected. When the last remote has been successfully linked, the engineman presses the ACCEPT key on the SETUP screen. The remote units are now communicating via the radio link and the train is ready for the system test.

The system provides the capability of maintaining the remote consists in a traction or dynamic brake mode when a loss of radio communication is experienced in deep cuts, in high RF interference areas, or in tunnel operation. As long as regular communications are successfully received by the remote units, they continue to operate in their commanded state.

Whenever radio communications have been interrupted for 45 seconds, each remote unit continues in the last commanded throttle and air brake state. If no changes in the braking system are detected, this continues for a period of 60 minutes, at which time the brake valve is cut out, and the throttle is stepped down to idle.

If after radio communications have been interrupted for 45 seconds, airbrake application is sensed, the remote unit initiates a radio communication s check with the lead unit. If no response is received, the remote (1) either reduces traction in steps to idle or maintains the current dynamic brake state and (2) cuts out the brake valve. This permits the engineman to eliminate remote tractive effort via an automatic application. To prevent the potentially unsafe loss of braking effort on a down grade, the dynamic brake mode is not reduced.

When radio communications are re-established, the remotes must be returned to the normal mode. The brake valve must be manually cut in when communications if restored. As in all modes, brake pipe pressure increases only occur when the engineman requests a release of the automatic brakes.

Communications between lead and remote units is typically by UHF radio. The use of this type of equipment requires operating licenses issued by the Federal Communication Commission or similar foreign government agency. The end user must secure this operating license. Data transmission by the radio is in the form of a frequency-shift-keyed (FSK) signal. A 3 khz bandwidth is used with modulation frequencies of 1300 Hz and 2100 Hz.

All DP data messages have the same general format and transmission characteristics. Each message consists of a series of words. The words use the standard asynchronous format. Each contains one start bit, eight data bits, one odd parity bit and one stop bit. The bits are transmitted on the radio using CCITT V.23 frequencies. Each message begins with a 2-word sequence having good auto-correlation characteristics (Barker code). This is used by all receiving stations to distinguish between messages and the random noise which is normal on unsquelched FM radios. Following this is a word which defines the total length of the message. All messages include the 16-bit address code of the originating station, a message length also varies. The last byte of each message is a longitudinal parity word. This word contains the bit-wise even parity for the entire message. The use of a word parity and a bit parity results in a "geometric" error detection code.

The Message Repeater uses one to three VHF or UHF transceivers. The signal interfaces are identical to those of the on-board system. The system uses standard LSI communication messages for Air Brake status monitoring, air brake control and distributed power control. These messages are summarized below. The details of the message formats may be found in LSI specification.

The interface to the IPM is an LSI Class B High-Level Data Link Control (HDLC) device. The IPM is capable of transmitting and receiving LSI Class B compliant messages. The HDLC communication interface connects the IPM module and the Integrated Locomotive Computer (ILC).

All RS-422A signals are isolated. The IPM 34 port meets the listed requirements.

I/O Signals RS-422A, Data and Clock;

Isolation 200 VDC;

Isolated Power Output +5 VDC at 20 mA;

Mode Synchronous/Asynchronous; and

Bit Rate 4800 to 38400 BPS (9600 BPS Initially).

The general packet framing for the data link messages is [start flag][address][control][header][data][CRC][end flag].

The following TABLE 4 gives a short description for each of the packet fields contained in the HDLC link message.

TABLE

HDLC Link Message Packet Fields

| Field | Length | Value |
|---|---|---|
| [start flag] | 8 bits | 01111110 (7E Hex) |
| [address] | 8 bits | Hardware address |
| [control] | 8 bits | Based on HDLC layer 2 protocol |
| [header] | 8 bits | Packet number |
|  | 8 bits | Format number |
|  | 8 bits | Format version number |
| [data] | 124 bytes max | Various |
| [CRC] | 16 bits | Use CCITT polynomial ($x^{16} + x12 + x5 +1$) Compute CRC over entire message starting with [address]. do not include end of packet framing flag in CRC. Seed value for the computation if FFF Hex. |
| [end flag] | 8 bits | 01111110 (7E Hex) |

The IPM 34 is capable of receiving 20 and transmitting 20 LSI Class B HDLC messages per second. The IPM (Integrated Processor Module) 34 is the main processor unit of the system. It contains a processor that performs all distributed power related tasks and generates high level command decisions related to electronic air brake functions based on the operator's inputs and commands from the locomotive control computer. This unit is also responsible for generating suitable communication messages for the integrated locomotive computer (ILC) 40 to manage operator's displays, health and status reporting and messages for the remote units in the consists to command or follow distributed power related commands and data.

The IPM 34 functions and tasks are summarized as follows. The IPM 34 accepts operator's inputs related to Distributed Power and Electronic Air Brake functions for the Locomotive Control Computer (or Throttle Controller) and the Electronic Brake Valve (EBV) 36 as well as other commands such as enforcement braking from the Locomotive Control Computer. The IPM 34 functions as the central controller for both distributed power as well as Electronic Air Brake functionalities. It interprets all inputs from the operator as well as Locomotive Control Computer (ILC) 40 related to these functions and executes appropriate software algorithms to make high level command and control decisions for DP and EAB functions related to safety including penalty brakes and assurance of correct EPCU response to commands.

The IPM 34 (in Lead mode) generates suitable command outputs (signals and messages) for distributed power tasks for lead and remote consists, low level control of electro-pneumatic components in EPCU 38 for air brake control functions, DP and EAB related operator's display management through locomotive control computer.

The IPM 34 also performs various communication tasks including periodic message exchange with locomotive control computer regarding health and status reporting, with other components of LOCOTROL EB system through the distributed control network as well as radio messages to the remote units through radio module and antenna module.

The Electronic Brake Valve (EBV) 36 includes separate automatic and independent brake handles. It is the primary HMI for the operator to issue air brake related commands to the system. The EBV also contains a local pressure display to indicate the target equalizing reservoir pressure to indicate the degree of brake actuation. The EBV 36 handle movements are translated into appropriate target pressures by the EBV processor and are fed to the IPM 34 and EPCU 38 to generate suitable air brake commands for the electro-pneumatic control unit (EPCU) to provide the desired air brake function.

The Electro-Pneumatic Control Unit (EPCU) 38 includes various electrical and electro-pneumatic components such as solenoid valves, relays, etc., necessary to provide low level air brake control functions. As shown in FIG. 5, It includes eight (8) functional sub-sections:
ER Control,
BP Control,
13 Control (Bail Off),
16 Control,
20 Control (A & R),
BC Control,
DBTV Control, and
PSJB Portion.

The ER control portion regulates the equalizing reservoir pressure in proportion to the braking effort demanded by the operator via EBV handles. The BP control portion controls the Brake Pipe pressure to the level of ER pressure through BP relay valve. This portion also includes suitable pneumatic and electronic components for the propagation of emergency brake application and brake pipe charging cut off. The 13 control portion controls the pressure in the 13 pipe for bail off operation. The 16 control portion compares the pressures in the Brake pipe, independent application and release pipe and 13 pipe. It subsequently controls the air pressure in the 16 pipe. The 16 control portion shall also have the logic of the ER control portion as an alternate.

The DBTV control portion provides a back up generation of 16 pipe in response to brake pipe reductions. The DBTV replaces the function of the 16 portion. The 20 pipe control portion regulates the pressure in the 20 pipe (Application and Release pipe) for independent brake application and release as demanded by the operator through EBV independent brake handle.

The BC control portion compares air pressures in 16 pipe and 20 pipe. It subsequently controls the Brake Cylinder pressure via the BC relay valve. It may also include an optional dynamic brake interlock control function. In general, the EPCU 38 receives command messages from the EBV and IPM that include target pressures for various air brake operational modes necessary to perform low level air brake control functions.

The radio module 32 includes two UHF/VHF radios for communication between the Lead unit and Remote Units. These radios have both data and voice options. The antenna module contains two UHF/VHF antenna for the radio link between lead and remote units.

The system is based on a distributed control architecture approach. The three major components of the system (IPM, EBV and EPCU) are connected to each other by a twisted pair LONWORKS distributed control network. The LONWORKS networks consists of Neuron (MC143150) integrated circuits and twisted pair transceivers (TBD) at each of the ten (10) nodes. LONTALK protocol is used for message exchange. The IPM 34 performs all network management tasks for the LONWORKS network.

The system contains an advanced fault diagnostics function for fault detection and fault isolation. Both operational and hardware faults are detected and corrective responses are suggested. No "nuisance" faults (a fault indication when no fault has occurred) are generated. All faults are automatically or manually resettable. Faults are classified in the following categories: Critical Failure, Mission Failure, Restrictive Failure, and Negligible Failure.

Each subsystem (IPM, EPCU, EBV and RM) is responsible for accurately detecting and reporting of failure(s)

resident within their own subsystem(s). The EPCU, EBV and RM subsystems do not need to have logic within their system to completely diagnose and isolate their respective fault(s). The IPM 34 receives fault detection messages from the EPCU, EBV, RM and IPM as necessary to diagnose and isolate the fault to the LRU level within the failed subsystem.

The IPM 34 reports LRU faults based on an ID number and/or short word description. The IPM maintains an organized data structure of fault ID's, fault descriptions, operator instructions or service instructions as required to convey the information necessary to report the LRU fault. A remote session or portable test unit (PTU) shall be used to report detailed information (beyond the LRU level) concerning the fault. The reporting of nuisance faults is with a goal of zero.

The IPM 34 utilizes fault recovery logic to safely report the fault, to accurately apply a brake penalty, to fully recover from the fault and/or suggest safe operating alternatives (limp-home modes) for the fault. Each LRU includes a "time meter" circuit to keep track of time which is necessary from fault analysis and reliability growth testing (RGT) viewpoint.

Capability included in the hardware and software of each subsystem enables future implementation of predictive diagnostics. The ability to track the number of cycles, duty cycle and/or total time in field for certain components could be useful for these predictive diagnostics. The diagnostics system attempts to predict line replaceable component failures at least 122 days before actual failure. By replacing components near failure at regularly scheduled maximum 122 day maintenance intervals, in service failures will be avoided.

The Logger is a data recording function in the DP/EAB system that collects and stores three basic types of information regarding the system: System Status, System Events, and System Faults.

The Logger is a DP/EAB onboard system feature which allows recording and time tagging of significant events that occur during DP/EAB operation. In addition, statistical information about system operation is accumulated. This data is later downloaded to an analysis unit for preview or printout. The portable test unit (PTU), a portable computer, facilitates the collection of data from the on-board unit, allows the preview of data while on board the locomotive and allows the printing of data off board.

The on-board event recorder unit accumulates data in the non-volatile RAM memory as the system is operated. The data and associated pointers etc. are contained in the RAM allocated for the logging function. Data is recorded in a 'continuous loop' buffer, which replaces the oldest data with the newest data. The buffer continuously overwrites old data and is not normally cleared. A pointer identifies the newest data record, or the beginning record for a print out. Whenever the system is linked, a link record is stored in the next available memory locations. The record includes the unit numbers, address codes, calendar date and clock time. Whenever the system is unlinked, an unlink record is stored. It includes the cause of the unlink in addition to the link record data. Periodically (@ 4 hours), a summary record is stored if the system is linked. This contains a summary of the system operations for that period. The data includes timers of warning conditions, event occurrence counter transmission counts, re-transmission counts, accumulated communication loss time, calendar date and clock time. When a significant event occurs, an event record is stored. Significant events include all emergency brake applications, penalty brake applications, and system failures (if possible to record). Each record includes the event description, operating parameters and system conditions.

Periodically, the data stored in the on-board equipment must be captured for analysis. To accomplish this, the portable Logger unit is connected to the System Module. The microprocessors transfer the stored data into the Logger unit diskette. When the transfer is complete, the operator is prompted to disconnect the Logger unit. The unit may then be used to capture data from other systems or may be used to preview any data on the disk.

When a data print out is required, the Logger unit is connected to the printer at the off board location. The Logger unit program permits the printing of all the data from any on board system. The operator may also print selectively by using the screen preview feature. The capture data files may be archived on disks for future use.

Since the non-volatile memory which is allocated to the Logger is not vital to system operation, and since data must be retained through power-cycles, the log memory is not reset and tested on power-up as is the system RAM. To provide some data integrity, a checksum of all data is calculated. This is stored as part of the summary record. The checksum is also calculated at print-out time. If an error is detected, the data is printed, but a warning is included in the summary record. Serial communications between the Logger unit and the on-board unit use parity. If a parity error is detected in the clock set messages, the message is ignored.

The human-machine interface (HMI) illustrates the functions performed by the system. Many custom configurations are possible. This HMI concept has the following advantages:

train operations are intuitive;

operational safety are not compromised;

all displays formats are consistent to maximize comprehension;

commands affecting train operation require a "select/execute" sequence to minimize false operations; and the "normal" display presents a concise, uncomplicated summary of the train status.

All operator interface is via the two display units of the Locomotive System Integration (LSI) 40 system. Each consists of a color graphic display panel and eight associated function keys. The right display includes the standard LSI display of locomotive, status, air brake status etc. In addition, a zone of this display maybe used for system set-up, system tests and alarm/event log display. In distributed power mode, the left display is used for lead and remote locomotive and air brake status as well as for independent control.

The HDLC communication interface is designed to interface with the ILC computer 40. Full communication ports will be supplied. All RS-422A signals should be isolated.

The IPM will interface with transceivers similar to the Motorola Spectra mobile radio. The operating frequency may be VHF, UHF or 800/900 MHz. The interface includes: modulated data I/O, transmitter key signals, and binary outputs for frequency selection.

A solenoid valve drive signal from the IPM 34 will control a 74 VDC emergency brake application solenoid valve. A second drive signal may be used to control an antenna switch relay for radio self-check.

The IPM size may be 11.5" (L)×9.25" (H))×4.9" (W) The radio module size is 17" (L)×13" (H)×6.5" (W). The IPM module is installed inside the LSI equipment cabinet. The IPM does not use forced air cooling. If required to meet the specified package size and if required to reduce product cost, surface-mount devices may be used on PC boards. The EPCU size is 38" (L)×20" (H)×17" (W). The EBV size is 10.75" (L)×8.25" (W).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A train control system for a train comprising a plurality of locomotives and an air brake system, each locomotive comprising a locomotive control computer, the train control system comprising:
   a plurality of control subsystems for installation in respective locomotives, at least one of the control subsystems configurable as a lead control subsystem, and at least one other control subsystem configurable as a remote control subsystem, each control subsystem comprising
      a radio transceiver,
      a first processor connected to said radio transceiver for communicating with at least one other control subsystem,
      an electronic brake valve connected to said first processor, and
      an electro-pneumatic controller connected to said first processor and said electronic brake valve, for interfacing to the air brake system of the train,
      said first processor comprising a locomotive computer interface for performing both distributed power and electronic air brake signals functions, said first processor further comprising a means for deselecting distributed power control functions.

2. A train control system according to claim 1, wherein each control subsystem further comprises at least one other processor associated with one of said electronic brake valve and said electro-pneumatic controller and operatively connected to said first processor.

3. A train control system according to claim 2, wherein said first processor and said at least one other processor each comprise distributed processing means for providing a distributed control network.

4. A train control system according to claim 3, wherein said distributed processing means provide for detection, isolation and response to failures.

5. A train control system according to claim 1, wherein said distributed power functions comprise at least one of tractive effort functions and dynamic braking functions.

6. A train control system according to claim 1, wherein said electronic air brake functions comprise at least one of automatic service braking, independent braking, and emergency braking.

7. A train control system according to claim 1, wherein each control subsystem further comprises a trainline drive/sense interface.

8. A train control system according to claim 1, wherein each control subsystem further comprises an antenna connected to said transceiver.

9. A train control system according to claim 1, wherein said first processor further comprises status information means for communicating status information when configured as a remote control subsystem.

10. A train control system according to claim 1, wherein said first processor further comprises command information means for communicating command information when configured as a lead control subsystem.

11. A train control system according to claim 1, wherein each control subsystem further comprises a first housing containing said first processor.

12. A train control system according to claim 11, wherein said electronic brake valve comprises a second housing; and wherein said electro-pneumatic controller comprises a third housing.

13. A train control system for a train comprising a plurality of locomotives and an air brake system, the train control system comprising:
   a plurality of control subsystems for installation in respective locomotives, at least one of the control subsystems configurable as a lead control subsystem, and at least one other control subsystem configurable as a remote control subsystem, each control subsystem comprising
      a radio transceiver,
      a first processor connected to said radio transceiver for communicating with at least one other control subsystem,
      an electronic brake valve comprising a second processor connected to said first processor, and
      an electro-pneumatic controller comprising a third processor connected to said first and second processors and for interfacing to the air brake system of the train,
      said first, second and third processors comprising means defining a distributed control network, said first processor further comprising means for deselecting distributed power control functions.

14. A train control system according to claim 13, wherein said first processor further comprises a locomotive computer interface for performing both distributed power and electronic air brake functions in cooperation with a locomotive control computer.

15. A train control system according to claim 13, wherein said distributed processing means provide for detection, isolation and response to failures.

16. A train control system according to claim 13, wherein said distributed power functions comprise at least one of tractive effort and dynamic braking functions.

17. A train control system according to claim 13, wherein said electronic air brake functions comprise at least one of automatic service braking, independent braking, and emergency braking.

18. A train control system according to claim 13, wherein each control subsystem further comprises a trainline drive/sense interface.

19. A train control system according to claim 13, wherein each control subsystem further comprises an antenna connected to said transceiver.

20. A train control system according to claim 13, wherein said first processor further comprises status information means for communicating status information when configured as a remote control subsystem.

21. A train control system according to claim 13, wherein said first processor further comprises command information means for communicating command information when configured as a lead control subsystem.

22. A train control system according to claim 13, wherein each control subsystem further comprises a first housing containing said first processor.

23. A train control system according to claim 22, wherein said electronic brake valve comprises a second housing; and wherein said electro-pneumatic controller comprises a third housing.

24. A train control system for a train comprising a plurality of locomotives and an air brake system each locomotive comprising a locomotive control computer, the train control system comprising:

a plurality of control subsystems for installation in respective locomotives, at least one of the control subsystems configurable as a lead control subsystem, and at least one other control subsystem configurable as a remote control subsystem, each control subsystem comprising
a radio transceiver,
a first housing,
a first processor within said first housing and connected to said radio transceiver for communicating with at least one other control subsystem,
an electronic brake valve connected to said first processor and comprising a second housing, and
an electro-pneumatic controller connected to said first processor and said electronic brake valve, for interfacing to the air brake system of the train, said electro-pneumatic controller comprising a third housing,
said first processor comprising a locomotive computer interface for performing both distributed power and electronic air brake functions in cooperation with the locomotive control computer, said first processor further comprising means for deselecting distributed power control function.

25. A train control system according to claim 24, wherein each control subsystem further comprises at least one other processor associated with one of said electronic brake valve and said electro-pneumatic controller and operatively connected to said first processor.

26. A train control system according to claim 25, wherein said first processor and said at least one other processor each comprise distributed processing means for providing a distributed control network.

27. A train control system according to claim 26, wherein said distributed processing means provide for detection, isolation and response to failures.

28. A train control system according to claim 24, wherein said distributed power functions comprise at least one of tractive effort and dynamic braking functions.

29. A train control system according to claim 24, wherein said electronic air brake functions comprises at least one of automatic service braking, independent braking, and emergency braking.

30. A train control system according to claim 24, wherein each control subsystem further comprises an antenna connected to said transceiver.

31. A train control system according to claim 24, wherein said first processor further comprises status information means for communicating status information when configured as a remote control subsystem.

32. A train control system according to claim 24, wherein said first processor further comprises command information means for communicating command information when configured as a lead control subsystem.

33. A train control method for a train comprising a plurality of locomotives and an air brake system, each locomotive comprising a locomotive control computer, the train control method comprising the steps of:

installing a plurality of controls subsystems in respective locomotives, each control subsystem comprising
a radio transceiver,
a first processor connected to said radio transceiver for communicating with at least one other control subsystem,
an electronic brake valve connected to said first processor, and
an electro-pneumatic controller connected to said first processor and said electronic brake valve, for interfacing to the air brake system of the train,
said first processor comprising a locomotive computer interface for performing both distributed power and electronic air brake functions in cooperation with the locomotive control computer;

configuring at least one of the control subsystems as a lead control subsystem;

configuring at least one other control subsystem as a remote control subsystem, and using the first processor for deselecting the distributed power control function.

34. A train control method according to claim 33, wherein each control subsystem further comprises at least one other processor associated with one of said electronic brake valve and said electro-pneumatic controller and operatively connected to said first processor for defining a distributed control network; and using the distributed control network for providing detection, isolation and response to failures.

35. A train control method according to claim 33, further comprising the step of using the first processor for communicating status information when configured as a remote control subsystem.

36. A train control method according to claim 33, further comprising the step of using the first processor for communicating command information when configured as a lead control subsystem.

* * * * *